No. 707,164. Patented Aug. 19, 1902.
F. SCHOELER.
INSTRUMENT FOR MEASURING THE DEGREE OF EXPOSURE TO LIGHT.
(Application filed Feb. 17, 1902.)
(No Model.)

Witnesses.

Inventor.
Felix Schoeler
per Attorneys

UNITED STATES PATENT OFFICE.

FELIX SCHOELER, OF BERLIN, GERMANY.

INSTRUMENT FOR MEASURING THE DEGREE OF EXPOSURE TO LIGHT.

SPECIFICATION forming part of Letters Patent No. 707,164, dated August 19, 1902.

Application filed February 17, 1902. Serial No. 94,511. (No model.)

*To all whom it may concern:*

Be it known that I, FELIX SCHOELER, a subject of the King of Prussia, German Emperor, residing at the city of Berlin, in the Kingdom of Prussia, Germany, have invented a new and useful Improvement in Instruments for Measuring the Degree of Exposure to Light, of which the following is a specification.

My invention relates to an instrument for measuring the intensity of the exposure to light on any occasion, such as is required in photography, for the purpose of determining how long the plate must be exposed to obtain a sharp picture.

My invention consists in the combination of a receptacle, somewhat in the form of a shaft and open at one end, with a dispersing-lens closing the other end and a parallel sliding toned plate for gradually darkening the image cast by the lens.

Figure 1:
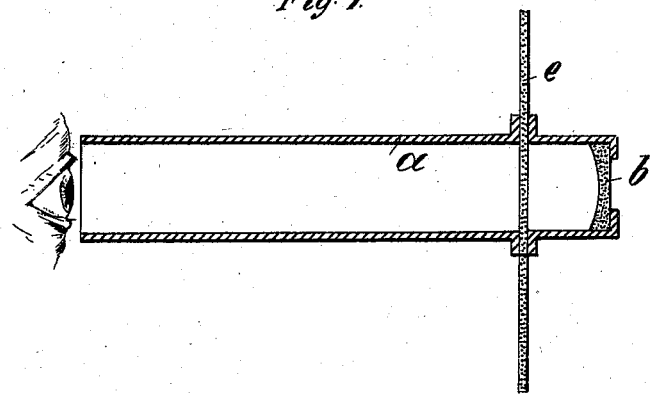
Figure 2:
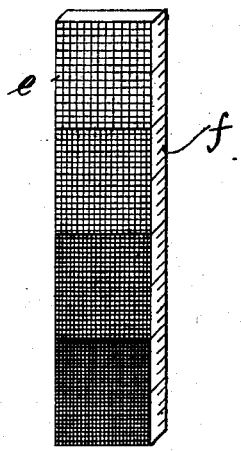

The accompanying drawings show in Figure 1 one form of the instrument in vertical section, and Fig. 2 shows in perspective the toned or graduated plate $e$.

$a$ is the receptacle, the inside walls of which are rendered as dark as possible, the walls as a whole being impervious to light. This receptacle $a$ is closed at one end by a lens $b$. Its other end is so formed that the eye can conveniently be applied to it without a ray of light falling into the receptacle.

$c$ is a plate which admits light to pass through and is shaded from a quite light part to a perfectly dark part, through which no light can pass, and which can be slid through the receptacle $a$. On the edge of this plate a scale $f$ is marked, so as to admit of the position of the plate in the receptacle at any time being read off.

The method of employing the apparatus is as follows: At a certain distance a dark screen on which is a bright spot is set up or a specially-illuminated very striking object is placed opposite the instrument. At this screen or object the instrument is directed after the eye has been firmly placed against it, so that no rays of light can enter laterally. The picture now appears to the eye—that is to say, it is cast through the lens into the receptacle $a$ as a very sharp image on a reduced scale. As long as the plate $c$, with the unshaded parts, receives the rays of light which penetrate into the receptacle through the lens the sharp reduced image remains visible. If now the plate $c$ is gradually pushed into the receptacle, the image will become more and more indistinct. When the observer believes that the image has quite vanished, the instrument is moved about for the purpose of setting the small spot of light in motion, whereupon it will again become visible. This manner of observation must be continued until in a certain position of the plate $c$ the spot of light vanishes altogether. The observer can now read off on the scale what was the intensity of exposure at the moment of measurement.

Instruments for the same purpose are already known, according to which an illuminated object is observed through toned plates for the purpose of determining the degree of exposure at which the object becomes invisible to the observer. These instruments, however, have neither the lens nor the receptacle in the form of a shaft. By means of the lens the illuminated object is fixed in sharp reduced size, so that it appears as a small sharp point, and on moving the instrument catches the eye. It is only in this way that it is possible with certainty to determine the moment in which the illuminated point really disappears from the eye. A body observed merely with the natural sight is unsatisfactory, disappearing on one occasion sooner than another.

Having thus described my invention, what I claim as new, and desire to secure by Letters Patent, is—

An exposure-meter comprising a tube one end of which is adapted to be placed light-tight against the eye, a concave lens at the other end, a plate of varying translucency and of uniform thickness adapted to be moved through the tube at right angles to its axis at a point between the eye and lens and in the focal plane of the latter, and a graduated scale on the edge of said plate, substantially as and for the purpose set forth.

In testimony that I claim the foregoing as my invention I have signed my name in presence of two subscribing witnesses.

FELIX SCHOELER.

Witnesses:
HENRY HASPER,
WOLDEMAR HAUPT.